United States Patent
Mock et al.

(10) Patent No.: US 9,994,458 B2
(45) Date of Patent: Jun. 12, 2018

(54) PROCESS FOR THE PREPARATION AND/OR PURIFICATION OF RUTHENIUM(III) CHLORIDE

(71) Applicants: Heraeus Deutschland GmbH & Co. KG, Hanau (DE); Heraeus South Africa (Pty.) Ltd., Port Elizabeth (ZA)

(72) Inventors: Christian Mock, Hanau (DE); David Fife, Port Elizabeth (ZA); Waldo Van Tonder, Port Elizabeth (ZA); Albert Joubert, Port Elizabeth (ZA); Walter Lässig, Gelnhausen (DE)

(73) Assignees: Heraeus Deutschland GmbH & Co. KG, Hanau (DE); Heraeus South Africa (Pty.) Ltd., Port Elizabeth (ZA)

( * ) Notice: Subject to any disclaimer, the term of this patent is extended or adjusted under 35 U.S.C. 154(b) by 0 days. days.

(21) Appl. No.: 15/508,281

(22) PCT Filed: Jun. 24, 2015

(86) PCT No.: PCT/EP2015/064266
§ 371 (c)(1),
(2) Date: Mar. 2, 2017

(87) PCT Pub. No.: WO2016/034301
PCT Pub. Date: Mar. 10, 2016

(65) Prior Publication Data
US 2017/0283274 A1 Oct. 5, 2017

(30) Foreign Application Priority Data

Sep. 3, 2014 (EP) ..................................... 14183404
Sep. 19, 2014 (EP) ..................................... 14185651

(51) Int. Cl.
*C01G 55/00* (2006.01)
*B01J 39/05* (2017.01)

(52) U.S. Cl.
CPC ............ *C01G 55/005* (2013.01); *B01J 39/05* (2017.01); *C01G 55/001* (2013.01)

(58) Field of Classification Search
CPC ................. C01G 55/001; C01G 55/005; B01J 39/00–39/07
USPC .................................................... 423/22, 491
See application file for complete search history.

(56) References Cited

FOREIGN PATENT DOCUMENTS

| GB | 1533541 A | 11/1978 |
|----|-----------|---------|
| JP | S59123730 A | 7/1984 |
| JP | S59145739 A | 8/1984 |
| JP | 2003239092 A | 8/2003 |

OTHER PUBLICATIONS

Translation of JP59-123730A, Jul. 1984.*
Translation of JP59-123739A, Aug. 1984.*
Int'l Search Report dated Oct. 22, 2015 in Int'l Application No. PCT/EP2015/064266.

* cited by examiner

*Primary Examiner* — Steven J Bos
(74) *Attorney, Agent, or Firm* — Panitch Schwarze Belisario & Nadel LLP

(57) ABSTRACT

The present invention relates to a process for the preparation of ruthenium(III) chloride ($RuCl_3$) as well to a process for the purification of ruthenium(III) chloride ($RuCl_3$) and a use of the process for the preparation or the purification of ruthenium(III) chloride ($RuCl_3$).

12 Claims, No Drawings

PROCESS FOR THE PREPARATION AND/OR PURIFICATION OF RUTHENIUM(III) CHLORIDE

CROSS-REFERENCE TO RELATED APPLICATIONS

This application is a Section 371 of International Application No. PCT/EP2015/064266, filed Jun. 24, 2015, which was published in the English language on Mar. 10, 2016 under International Publication No. WO 2016/034301 A1 and the disclosure of which is incorporated herein by reference.

BACKGROUND OF THE INVENTION

The present invention relates to a process for the preparation of ruthenium(III) chloride ($RuCl_3$), as well as to a process for the purification of ruthenium(III) chloride ($RuCl_3$) and a use of the process for the preparation or the purification of ruthenium(III) chloride ($RuCl_3$).

The preparation of ruthenium(III) chloride is well known in the art. For example, it is known to prepare ruthenium(III) chloride by the thermal decomposition of ammonium hexachlororuthenate(IV), the subsequent treatment of the obtained metal with a mixture of NaOH and NaOCl, and reducing the obtained $Na_2RuO_4$ to $RuO_2$, which is then filtered and washed. In the following, the obtained $RuO_2$ is treated with hydrochloric acid for obtaining a raw solution of ruthenium(III) chloride. However, the raw ruthenium(III) chloride solution is typically purified by distillation, for which the ruthenium(III) chloride must be first oxidized to ruthenium(IV) oxide, which is then distilled. Finally, the distilled ruthenium(IV) oxide is reduced again to ruthenium (III) chloride.

A disadvantage of the above-mentioned process is that the purification of the raw solution of ruthenium(III) chloride by distillation has to be carried out in a cascade of numerous steps, including an oxidizing step, the distillation of the oxidized product, and the subsequent reduction of the oxidized product back to the final ruthenium(III) chloride. This kind of purification thus requires suitable and complicated distillation equipment, as well as a high amount of chemicals for the corresponding oxidizing and reducing reaction and, further, the numerous steps are time-consuming and lead to a relative high loss of ruthenium(III) chloride.

Thus, there is a need in the art for providing a process which avoids the foregoing disadvantages and especially allows for the preparation and/or purification of ruthenium (III) chloride with a high yield. In particular, it is desirable to provide a time-efficient process for the preparation and/or purification of ruthenium(III) chloride which can be carried out without complicated distillation equipment and without using a cascade of oxidizing and reducing reactions.

BRIEF SUMMARY OF THE INVENTION

Accordingly, it is an object of the present invention to provide a process for the preparation and/or purification of ruthenium(III) chloride. Furthermore, it is an object of the present invention to provide a process in which the ruthenium(III) chloride is obtained in high yield. It is an even further object of the present invention to provide a process in which no complicated distillation equipment is required. Another object of the present invention is to provide a process in which no cascade of oxidizing and reducing reactions is required. A still further object of the present invention is to provide a process which can be carried out in a time-efficient manner. Further objects can be gathered from the following description of the invention.

DETAILED DESCRIPTION OF THE INVENTION

The foregoing and other objects are solved by the subject-matter of the present invention. According to a first aspect of the present invention, a process for the preparation of ruthenium(III) chloride ($RuCl_3$) is provided. The process comprises at least the steps of:
  a) providing a hydrochloric acid solution,
  b) providing at least one ruthenium salt of the formula (I)

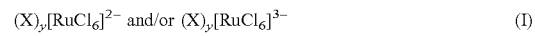

$(X)_y[RuCl_6]^{2-}$ and/or $(X)_y[RuCl_6]^{3-}$      (I)

wherein X is a monovalent, divalent or trivalent cation, and y is 1, 2 or 3,
  c) combining the hydrochloric acid solution of step a) and the at least one ruthenium salt of step b) and heating the obtained mixture to a temperature T of ≥70° C.,
  d) adjusting the pH of the mixture obtained in step c) to a pH from 0 to 2, and
  e) passing the mixture obtained in step d) through a cation exchanger for obtaining a solution comprising ruthenium(III) chloride ($RuCl_3$),
  wherein step e) is carried out after step d).

According to another aspect of the present invention, a process for the purification of ruthenium(III) chloride ($RuCl_3$) is provided. The process comprises at least the steps of:
  a) providing a hydrochloric acid solution,
  b) providing ruthenium(III) chloride either in dry form or in form of a solution, wherein the ruthenium(III) chloride comprises impurities,
  c) combining the hydrochloric acid solution of step a) and the ruthenium(III) chloride of step b) and heating the obtained mixture to a temperature T of ≥70° C.,
  d) adjusting the pH of the mixture obtained in step c) to a pH from 0 to 2, and
  e) passing the mixture obtained in step d) through a cation exchanger for obtaining a solution comprising ruthenium(III) chloride ($RuCl_3$),
  wherein step e) is carried out after step d)

Advantageous embodiments of the inventive process for the preparation of ruthenium(III) chloride ($RuCl_3$) and/or the process for the purification of ruthenium(III) chloride ($RuCl_3$) are described below.

According to one embodiment, the $RuCl_3$ obtained is in dry form or in the form of a solution.

According to another embodiment, in the formula (I) X is i) a monovalent cation selected from $NH_4^+$, $Na^+$, $K^+$, $Cu^+$ and mixtures thereof and y is 2 or 3, or i) a divalent cation selected from $Cd^{2+}$, $Co^{2+}$, $Cu^{2+}$, $Ni^{2+}$, $Pb^{2+}$, $Zn^{2+}$, $Sn^{2+}$, $Fe^{2+}$, $Mg^{2+}$, $Ca^{2+}$ and mixtures thereof and y is 1, or iii) a trivalent cation selected from $Fe^{3+}$ and y is 1.

According to yet another embodiment, in process step c) the obtained mixture is heated to a temperature T in the range from 70° C. to 110° C.

According to one embodiment, the mixture obtained in step c) is concentrated before adjusting step d) is carried out.

According to another embodiment, concentrating step d) is carried out such that the total weight of the obtained mixture is reduced by at least 15.0 wt.-%, based on the total weight of the mixture obtained in step c).

According to yet another embodiment, the concentrating is carried out by rotary evaporation or distillation.

According to one embodiment, process step d) is carried out in that the pH of the mixture obtained in step c) is adjusted to a pH from 0 to 1.5.

According to another embodiment, process step e) is carried out within a period of not more than 2 hours after step d), preferably not more than 1 hour after step d), and most preferably not more than 30 minutes after step d).

According to yet another embodiment, the process further comprises step f) concentrating the solution obtained in step e).

According to one embodiment, concentrating step f) is carried out until $RuCl_3$ is crystallized from the solution.

According to another embodiment, step f) is carried out by evaporation.

According to a further aspect, a use of the process for the preparation or the purification of ruthenium(III) chloride ($RuCl_3$) is provided.

In the following, the details and preferred embodiments of the inventive processes will be described in more detail.

According to step a) of the instant process for the preparation of ruthenium(III) chloride ($RuCl_3$), a hydrochloric acid solution is provided.

It is appreciated that the hydrochloric acid solution is preferably an aqueous hydrochloric acid solution.

The term "aqueous" hydrochloric acid solution refers to a system in which the solvent comprises water. However, it is not excluded that the solvent comprises minor amounts of a water-miscible organic solvent selected from the group consisting of methanol, ethanol, acetone, acetonitrile, tetrahydrofuran and mixtures thereof. If the solvent comprises a water-miscible organic solvent, the water-miscible organic solvent is present in an amount from 0.01 to 20.0 wt.-%, preferably from 0.01 to 15.0 wt.-%, more preferably from 0.01 to 10.0 wt.-% and most preferably from 0.01 to 5.0 wt.-%, based on the total weight of the solvent. The water to be used as solvent for the hydrochloric acid can be any water available such as tap water and/or deionized water, preferably deionized water.

In one embodiment, the solvent of the aqueous hydrochloric acid solution consists of water, i.e. the solvent is free of a water-miscible organic solvent. If the solvent of the aqueous hydrochloric acid solution consists of water, the water to be used can be any water available such as tap water and/or deionized water, preferably deionized water.

Preferably, the hydrochloric acid solution comprises hydrochloric acid in an amount of at least 10.0 wt.-%, more preferably at least 20.0 wt.-% and most preferably at least 30.0 wt.-%, based on the total weight of the hydrochloric acid solution. In one embodiment, the hydrochloric acid solution is a concentrated hydrochloric acid solution. For example, the hydrochloric acid solution comprises hydrochloric acid in an amount from 30.0 to 37.0 wt.-%, based on the total weight of the hydrochloric acid solution.

According to step b) of the instant process for the preparation of ruthenium(III) chloride ($RuCl_3$), at least one ruthenium salt is provided. It is one requirement that the at least one ruthenium salt is a compound of the formula (I)

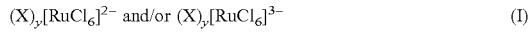 (I)

wherein X is a monovalent, divalent or trivalent cation, and y is 1, 2 or 3.

The term "at least one" ruthenium salt means that the ruthenium salt comprises, preferably consists of, one or more ruthenium salt(s).

In one embodiment, the at least one ruthenium salt comprises, preferably consists of, one ruthenium salt of formula (I). Alternatively, the at least one ruthenium salt comprises, preferably consists of, two or more ruthenium salts of formula (I). For example, the at least one ruthenium salt comprises, preferably consists of, two or three ruthenium salts of formula (I). In other words, if the at least one ruthenium salt comprises, preferably consists of, two or more ruthenium salts, the at least one ruthenium salt of formula (I) comprises, preferably consists of, a mixture of different ruthenium salts of formula (I).

If the at least one ruthenium salt of formula (I) is a mixture of different ruthenium salts, the mixture comprises, preferably consists of, two to five ruthenium salts of formula (I). For example, the mixture of the ruthenium salts of formula (I) comprises, preferably consists of, two or three ruthenium salt(s) of formula (I).

Preferably, the at least one ruthenium salt comprises, more preferably consists of, one ruthenium salt of formula (I).

In one embodiment the process for the preparation of ruthenium(III) chloride ($RuCl_3$). the at least one ruthenium salt is

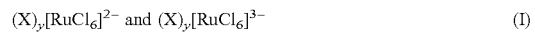 (I)

wherein X is a monovalent, divalent or trivalent cation and y is 1, 2 or 3.

Alternatively, the at least one ruthenium salt is

 (I), wherein X is a monovalent or divalent cation and y is 1 or 2, or

 (I), wherein X is a monovalent or trivalent cation and y is 1 or 3.

Preferably, the at least one ruthenium salt is

 (I), wherein X is a monovalent or divalent cation and y is 1 or 2.

It is appreciated that in the formula (I), X may be any monovalent, divalent or trivalent cation typically found in such ruthenium salts.

In one embodiment of the present invention, in the formula (I) X is i) a monovalent cation selected from the group consisting of $NH_4^+$, $Na^+$, $K^+$, $Cu^+$ and mixtures thereof and y is 2 or 3, or ii) a divalent cation selected from the group consisting of $Cd^{2+}$, $Co^{2+}$, $Cu^{2+}$, $Ni^{2+}$, $Pb^{2+}$, $Zn^{2+}$, $Sn^{2+}$, $Fe^{2+}$, $Mg^{2+}$, $Ca^{2+}$ and mixtures thereof and y is 1, or iii) a trivalent cation selected from $Fe^{3-}$ and y is 1.

For example, X is a monovalent cation selected from the group consisting of $NH_4^+$, $Na^+$, $K^+$, $Cu^+$ and mixtures thereof and y is 2 or 3. If X is a monovalent cation, X is preferably selected from the group consisting of $NH_4^+$, $Na^+$, $K^+$ and mixtures thereof, more preferably X is preferably selected from $NH_4^+$, $Na^+$ and mixtures thereof and most preferably X is $NH_4^-$ and y is 2 or 3.

For example, the at least one ruthenium salt is

 (I), wherein X is a monovalent cation and y is 2, preferably X is selected from the group consisting of $NH_4^+$, $Na^+$, $K^+$, $Cu^+$ and mixtures thereof and y is 2. More preferably, X is selected from the group consisting of $NH_4^+$, $Na^+$, $K^+$ and mixtures thereof, even more preferably X is preferably selected from $NH_4^+$, $Na^+$ and mixtures thereof and most preferably X is $NH_4^+$ and y is 2.

Additionally or alternatively, the at least one ruthenium salt is

$(X)_y[RuCl_6]^{3-}$ (I), wherein X is a monovalent cation and y is 3, preferably X is selected from the group consisting of $NH_4^+$, $Na^+$, $K^+$, $Cu^+$ and mixtures thereof and y is 3. More preferably, X is selected from the group consisting of $NH_4^-$, $Na^+$, $K^+$ and mixtures thereof, more preferably X is preferably selected from $NH_4^+$, $Na^+$ and mixtures thereof and most preferably X is $NH_4^+$ and y is 3.

Alternatively, X is a divalent cation selected from the group consisting of $Cd^{2-}$, $Co^{2-}$, $Cu^{2+}$, $Ni^{2+}$, $Pb^{2+}$, $Zn^{2+}$, $Sn^{2+}$, $Fe^{2+}$, $Mg^{2+}$, $Ca^{2+}$, and mixtures thereof and y is 1. If X is a divalent cation, X is preferably selected from the group consisting of $Co^{2-}$, $Cu^{2+}$, $Ni^{2+}$, $Pb^{2+}$, $Zn^{2+}$, $Sn^{2+}$, $Fe^{2+}$ and mixtures thereof and y is 1.

For example, the at least one ruthenium salt is

$(X)_y[RuCl_6]^{2-}$ (I), wherein X is a divalent cation and y is 1, preferably X is selected from the group consisting of $Cd^{2+}$, $Co^{2+}$, $Cu^{2+}$, $Ni^{2+}$, $Pb^{2+}$, $Zn^{2+}$, $Sn^{2+}$, $Fe^{2+}$, $Mg^{2+}$, $Ca^{2+}$, and mixtures thereof and y is 1.

More preferably, X is selected from the group consisting of $Co^{2+}$, $Cu^{2+}$, $Ni^{2+}$, $Pb^{2+}$, $Zn^{2+}$, $Sn^{2+}$, $Fe^{2+}$ and mixtures thereof and y is 1.

Alternatively, X is a trivalent cation selected from $Fe^{3+}$, and y is 1.

For example, the at least one ruthenium salt is

$(X)_y[RuCl_6]^{3-}$ (I), wherein X is a trivalent cation and y is 1, preferably X is $Fe^{3+}$ and y is 1. Accordingly, X is a monovalent cation and y is 2 or 3 or X is a divalent cation and y is 1 or X is a trivalent cation and y is 1. Preferably, X is a monovalent cation and y is 2 or 3. More preferably, X is selected from the group consisting of $NH_4^+$, $Na^+$, $K^+$ and mixtures thereof, more preferably X is preferably selected from $NH_4^+$, $Na^+$ and mixtures thereof and most preferably X is $NH_4^+$.

In one embodiment, $(X)_y$ in the formula (I) is $NH_4^+$ and y is 2 or 3, preferably 2. That is to say, the at least one ruthenium salt of formula (I) is preferably diammonium hexachlororuthenate or triammonium hexachlororuthenate. Most preferably, the at least one ruthenium salt of formula (I) is diammonium hexachlororuthenate.

According to step c) of the instant process for the preparation of ruthenium(III) chloride ($RuCl_3$), the hydrochloric acid solution of step a) and the at least one ruthenium salt of step b) are combined and the obtained mixture is heated to a temperature T of $\geq 70°$ C.

In the process for the preparation of ruthenium(III) chloride ($RuCl_3$), the combining of the hydrochloric acid solution of step a) and the at least one ruthenium salt of step b) can be carried out by every means known to the skilled person for preparing a mixture of the hydrochloric acid solution and the at least one ruthenium salt. For example, combining of the hydrochloric acid solution of step a) and the at least one ruthenium salt of step b) is preferably carried out by mixing the hydrochloric acid solution with the at least one ruthenium salt. "Mixing" in the sense of the present invention can be effected by any conventional mixing process known to the skilled person. Preferably, the mixing is carried out under continuous agitation in order to evenly distribute the at least one ruthenium salt of step b) in the hydrochloric acid solution of step a).

In one embodiment of the process for the preparation of ruthenium(III) chloride ($RuCl_3$), the combining of the hydrochloric acid solution of step a) and the at least one ruthenium salt of step b) is carried out at room temperature, e.g., a temperature in the range from 10 to 30° C., preferably in the range from 15 to 25° C. and most preferably in the range from 20 to 25° C.

In step c) of the process for the preparation of ruthenium (III) chloride ($RuCl_3$), the hydrochloric acid solution of step a) and the at least one ruthenium salt of step b) are preferably combined such that the mole ratio of HCl in the hydrochloric acid solution to the at least one ruthenium salt ($HCl/(X)_y$ $[RuCl_6]^{2-}$ and/or $(X)_y[RuCl_6]^{3-}$) is from 20:1 to 1:1, more preferably from 15:1 to 1:1, even more preferably from 10:1 to 1:1 and most preferably from 5:1 to 2:1.

It is a further requirement of step c) of the process for the preparation of ruthenium(III) chloride ($RuCl_3$) that the mixture obtained by combining of the hydrochloric acid solution of step a) and the at least one ruthenium salt of step b) is heated to a temperature T of $\geq 70°$ C.

In one embodiment, the mixture obtained by combining of the hydrochloric acid solution of step a) and the at least one ruthenium salt of step b) is heated to a temperature T in the range from 70° C. to 110° C., preferably in the range from 70° C. to 100° C., more preferably in the range from 75° C. to 90° C. and most preferably in the range from 75° C. to 85° C.

The heating in step c) of the process for the preparation of ruthenium(III) chloride ($RuCl_3$) is preferably carried out for a period of time of at least 5 min, more preferably of at least 10 min and most preferably of at least 20 min. In a preferred embodiment, the heating in step c) of the process for the preparation of ruthenium(III) chloride ($RuCl_3$) is carried out for a period of time of between 5 min and 180 min, preferably between 10 min and 120 min and most preferably between 20 min and 120 min, e.g., for 30 min or 120 min. For example, the heating in step c) of the process for the preparation of ruthenium(III) chloride ($RuCl_3$) is carried out under continuous stirring at a constant temperature of about 80° C. for a period of time of 30 min or 120 min.

After heating the mixture obtained by combining of the hydrochloric acid solution of step a) and the at least one ruthenium salt of step b), the mixture obtained in step c) is preferably allowed to cool down. More preferably, the mixture obtained in step c) is allowed to cool down to room temperature.

In one embodiment of the instant process for the preparation of ruthenium(III) chloride ($RuCl_3$), the mixture obtained in step c) is concentrated before adjusting step d) is carried out.

It is appreciated that the concentrating step can be carried out by every means known to the skilled person for reducing the amount of solvent in the mixture obtained in step c). For example, the concentrating step is preferably carried out by rotary evaporation or distillation, preferably rotary evaporation.

If the mixture obtained in step c) is concentrated before adjusting step d) is carried out, the concentrating step is carried out such that the total weight of the obtained mixture is reduced by at least 15.0 wt.-%, based on the total weight of the mixture obtained in step c). For example, the total weight of the obtained mixture is reduced by at least 25.0 wt.-%, more preferably by at least 30.0 wt.-% and most preferably by at 35.0 wt.-%, based on the total weight of the mixture obtained in step c) in the concentrating step.

It is to be noted that it is favorable for the overall yield in the process for the preparation of ruthenium(III) chloride (RuCl$_3$) that the mixture obtained in step c) is a clear solution of the at least one ruthenium salt of formula (I) in the hydrochloric acid solution, i.e., the solution is free of ruthenium salt solids. If the mixture obtained in step c) contains ruthenium salt solids, the mixture obtained in step c) is, before step d) is carried out, preferably diluted with water, preferably deionized water, and mixed for a sufficient period of time at an elevated temperature in order to ensure a complete dissolution of the at least one ruthenium salt of formula (I) in the solvent. If the mixture obtained in step c) is concentrated before adjusting step d) is carried out, the optional dilution with water, preferably deionized water, is preferably carried out before the concentrating step.

Preferably, the complete dissolution of the at least one ruthenium salt of formula (I) in the solvent is carried out under continuous stirring at elevated temperature. In one embodiment, the complete dissolution of the at least one ruthenium salt of formula (I) in the solvent is carried out under continuous stirring at a constant temperature of at least 80° C., preferably of at least 90° C., more preferably of between 80° C. and 120° C. and most preferably of between 90° C. and 110° C. In another embodiment, the complete dissolution of the at least one ruthenium salt of formula (I) in the solvent is carried out under continuous stirring at a constant temperature of about 100° C.

In case the mixture obtained in step c) contains ruthenium salt solids such that the mixture obtained in step c) is, before step d) is carried out, diluted with water and mixed for a sufficient period of time at an elevated temperature, the complete dissolution is preferably carried out for a period of time of at least 10 min, more preferably of at least 20 min and most preferably of at least 45 min. In one embodiment, the complete dissolution is carried out for a period of time of between 10 min and 120 min, preferably between 20 min and 90 min and most preferably between 45 min and 90 min, e.g., for about 60 min. For example, the complete dissolution of the at least one ruthenium salt of formula (I) in the solvent is carried out under continuous stirring at a constant temperature of about 100° C. for a period of time of about 60 min.

According to step d) of the instant process for the preparation of ruthenium(III) chloride (RuCl$_3$), the pH of the mixture obtained in step c), or the optional concentrating step, is adjusted to a pH from 0 to 2.

It is appreciated that pH adjustment step d) can be carried out by every means known to the skilled person for increasing the pH of a mixture to a pH from 0 to 2. For example, pH adjustment step d) is preferably carried out by adding water, more preferably deionized water.

In one embodiment of the instant process for the preparation of ruthenium(III) chloride (RuCl$_3$), the pH of the mixture obtained in step c), or the optional concentrating step, is adjusted to a pH from 0 to 1.5, preferably from 0.5 to 1.0 in process step d), preferably by adding water, more preferably deionized water.

According to step e) of the instant process for the preparation of ruthenium(III) chloride (RuCl$_3$), the mixture obtained in step d) is passed through a cation exchanger.

It is appreciated that process step e) can be carried out by every cation exchanger and cation exchange method known to the skilled person. For example, process step e) is preferably carried out by using a strong cation exchanger. Examples of advantageous cation exchanger are known as DOWEX MONOSPHERE™ 650 C resin, AMBERJET™ 1200 or LEWATIT® S100H resin.

In the instant process for the preparation of ruthenium(III) chloride (RuCl$_3$), it is decisive that process step e) is carried out immediately after process step d) in order to obtain ruthenium(III) chloride in high yield.

It is thus one requirement of the process for the preparation of ruthenium(III) chloride (RuCl$_3$) that process step e) is carried out after process step d).

It is appreciated that the term "after" process step d) refers to the point in time after which process step d) is completed, i.e., after which the pH of the mixture obtained in step c) has been adjusted to a pH from 0 to 2, preferably to a pH from 0 to 1.5, and most preferably to a pH from 0.5 to 1.0.

In one embodiment of the present process for the preparation of ruthenium(III) chloride (RuCl$_3$), process step e) is carried out immediately after process step d). Preferably, process step e) is carried out within a period of not more than 2 hours after process step d). More preferably, process step e) is carried out within a period of not more than 1 hour after process step d). Most preferably, process step e) is carried out within a period of not more than 30 minutes after process step d).

In process step e) a solution comprising ruthenium(III) chloride (RuCl$_3$) is obtained. Accordingly, the ruthenium (III) chloride (RuCl$_3$) obtained by the process for the preparation of ruthenium(III) chloride (RuCl$_3$) is in the form of a solution.

In one embodiment of the instant process for the preparation of ruthenium(III) chloride (RuCl$_3$), the RuCl$_3$ is separated from the solution obtained in step e), preferably RuCl$_3$ is separated as solid from the solution obtained in process step e).

If ruthenium(III) chloride (RuCl$_3$) is to be obtained as a solid from the solution obtained in step e), the process for the preparation of ruthenium(III) chloride (RuCl$_3$) preferably further comprises step f), concentrating the solution obtained in step e).

It is appreciated that concentrating step f) can be carried out by every means known to the skilled person for reducing the amount of solvent in the ruthenium(III) chloride solution obtained in step e). For example, concentrating step f) is preferably carried out by evaporation such as rotary evaporation or distillation, preferably evaporation such as rotary evaporation.

In one embodiment of the process for the preparation of ruthenium(III) chloride (RuCl$_3$), concentrating step f) is carried out until ruthenium(III) chloride (RuCl$_3$) is crystallized from the solution obtained in step e). For example, concentrating step f) is carried out until ruthenium(III) chloride (RuCl$_3$) is crystallized from the solution obtained in step e) in essentially completely dried form.

Thus, it is to be noted that the ruthenium(III) chloride (RuCl$_3$) obtained by the instant process for the preparation of ruthenium(III) chloride (RuCl$_3$) can be obtained in dry form.

It is appreciated that the instant process can also advantageously be used for the purification of ruthenium(III) chloride (RuCl$_3$).

Accordingly, the instant invention refers to a process for the purification of ruthenium(III) chloride (RuCl$_3$); the process comprises at least the steps of:
  a) providing a hydrochloric acid solution,
  b) providing ruthenium(III) chloride either in dry form or in the form of a solution, wherein the ruthenium(III) chloride comprises impurities,
  c) combining the hydrochloric acid solution of step a) and the ruthenium(III) chloride of step b) and heating the obtained mixture to a temperature T of ≥70° C.,
  d) adjusting the pH of the mixture obtained in step c) to a pH from 0 to 2, and e) passing the mixture obtained in step d) through a cation exchanger for obtaining a solution comprising ruthenium(III) chloride ($RuCl_3$), wherein step e) is carried out after step d)

According to step a) of the instant process for the purification of ruthenium(III) chloride ($RuCl_3$), a hydrochloric acid solution is provided.

It is appreciated that the hydrochloric acid solution is preferably an aqueous hydrochloric acid solution.

The term "aqueous" hydrochloric acid solution refers to a system in which the solvent comprises water. However, it is not excluded that the solvent comprises minor amounts of a water-miscible organic solvent selected from the group consisting of methanol, ethanol, acetone, acetonitrile, tetrahydrofuran and mixtures thereof. If the solvent comprises a water-miscible organic solvent, the water-miscible organic solvent is present in an amount from 0.01 to 20.0 wt.-%, preferably from 0.01 to 15.0 wt.-%, more preferably from 0.01 to 10.0 wt.-% and most preferably from 0.01 to 5.0 wt.-%, based on the total weight of the solvent. The water to be used as solvent for the hydrochloric acid can be any water available such as tap water and/or deionized water, preferably deionized water.

In one embodiment, the solvent of the aqueous hydrochloric acid solution consists of water, i.e., the solvent is free of a water-miscible organic solvent. If the solvent of the aqueous hydrochloric acid solution consists of water, the water to be used can be any water available such as tap water and/or deionized water, preferably deionized water.

Preferably, the hydrochloric acid solution comprises hydrochloric acid in an amount of at 10.0 wt.-%, more preferably at least 20.0 wt.-% and most preferably at least 30.0 wt.-%, based on the total weight of the hydrochloric acid solution. In one embodiment, the hydrochloric acid solution is a concentrated hydrochloric acid solution. For example, the hydrochloric acid solution comprises hydrochloric acid in an amount from 30.0 to 37.0 wt.-%, based on the total weight of the hydrochloric acid solution.

According to step b) of the instant process for the purification of ruthenium(III) chloride ($RuCl_3$), ruthenium(III) chloride is provided. It is appreciated that the ruthenium(III) chloride provided in step b) can be either in dry form or in form of a solution.

If the ruthenium(III) chloride provided in step b) is in form of a solution, the solvent of the solution is preferably hydrochloric acid.

It is one requirement of the process for the purification of ruthenium(III) chloride ($RuCl_3$) that the ruthenium(III) chloride comprises impurities. The impurities are preferably selected from at least one ruthenium salt being a compound of the formula (I)

$(X)_y[RuCl_6]^{2-}$ and/or $(X)_y[RuCl_6]^{3-}$ (I)

wherein X is a monovalent, divalent or trivalent cation and y is 1, 2 or 3.

In one embodiment of the process for the purification of ruthenium(III) chloride ($RuCl_3$) the at least one ruthenium salt is $(X)_y[RuCl_6]^{2-}$ and $(X)_y[RuCl_6]^{3-}$ (I)

wherein X is a monovalent, divalent or trivalent cation and y is 1, 2 or 3.

Alternatively, the at least one ruthenium salt is $(X)_y[RuCl_6]^{2-}$ (I), wherein X is a monovalent or divalent cation and y is 1 or 2, or $(X)_y[RuCl_6]^{3-}$ (I), wherein X is a monovalent or trivalent cation and y is 1 or 3.

Preferably, the at least one ruthenium salt is $(X)_y[RuCl_6]^{2-}$ (I), wherein X is a monovalent or divalent cation and y is 1 or 2.

It is appreciated that in the formula (I), X may be any monovalent, divalent or trivalent cation typically found in such ruthenium salts.

In one embodiment, in the formula (I) X is
i) a monovalent cation selected from the group consisting of $NH_4^+$, $Na^+$, $K^+$, $Cu^+$ and mixtures thereof and y is 2 or 3, or
ii) a divalent cation selected from the group consisting of $Cd^{2+}$, $Co^{2+}$, $Cu^{2+}$, $Ni^{2+}$, $Pb^{2+}$, $Zn^{2+}$, $Sn^{2+}$, $Fe^{2+}$, $Mg^{2+}$, $Ca^{2+}$ and mixtures thereof and y is 1, or
iii) a trivalent cation selected from $Fe^{3+}$ and y is 1.

For example, X is a monovalent cation selected from the group consisting of $NH_4^+$, $Na^+$, $K^+$, $Cu^+$ and mixtures thereof and y is 2 or 3. If X is a monovalent cation, X is preferably selected from the group consisting of $NH_4^+$, $Na^+$, $K^+$ and mixtures thereof, more preferably X is preferably selected from $NH_4^+$, $Na^+$ and mixtures thereof and most preferably X is $NH_4^-$ and y is 2 or 3.

For example, the at least one ruthenium salt is $(X)_y[RuCl_6]^{2-}$ (I), wherein X is a monovalent cation and y is 2, preferably X is selected from the group consisting of $NH_4^+$, $Na^+$, $K^+$, $Cu^+$ and mixtures thereof and y is 2. More preferably, X is selected from the group consisting of $NH_4^+$, $Na^+$, $K^+$ and mixtures thereof, even more preferably X is preferably selected from $NH_4^+$, $Na^+$ and mixtures thereof and most preferably X is $NH_4^+$ and y is 2.

Additionally or alternatively, the at least one ruthenium salt is $(X)_y[RuCl_6]^{3-}$ (I), wherein X is a monovalent cation and y is 3, preferably X is selected from the group consisting of $NH_4^-$, $Na^+$, $K^+$, $Cu^+$ and mixtures thereof and y is 3. More preferably, X is selected from the group consisting of $NH_4^+$, $Na^+$, $K^+$ and mixtures thereof, more preferably X is preferably selected from $NH_4^+$, $Na^+$ and mixtures thereof and most preferably X is $NH_4^-$ and y is 3.

Alternatively, X is a divalent cation selected from the group consisting of $Cd^{2+}$, $Co^{2+}$, $Cu^{2+}$, $Ni^{2+}$, $Pb^{2+}$, $Zn^{2+}$, $Sn^{2+}$, $Fe^{2+}$, $Mg^{2+}$, $Ca^{2+}$, and mixtures thereof and y is 1. If X is a divalent cation, X is preferably selected from the group consisting of $Co^{2-}$, $Cu^{2+}$, $Ni^{2+}$, $Pb^{2+}$, $Zn^{2+}$, $Sn^{2+}$, $Fe^{2+}$ and mixtures thereof and y is 1.

For example, the at least one ruthenium salt is $(X)_y[RuCl_6]^{2-}$ (I), wherein X is a divalent cation and y is 1, preferably X is selected from the group consisting of $Cd^{2+}$, $Co^{2+}$, $Cu^{2+}$, $Ni^{2+}$, $Pb^{2+}$, $Zn^{2+}$, $Sn^{2+}$, $Fe^{2+}$, $Mg^{2+}$, $Ca^{2+}$, and mixtures thereof and y is 1. More preferably, X is selected from the group consisting of $Co^{2+}$, $Cu^{2+}$, $Ni^{2+}$, $Pb^{2+}$, $Zn^{2+}$, $Sn^{2+}$, $Fe^{2+}$ and mixtures thereof and y is 1.

Alternatively, X is a trivalent cation selected from $Fe^{3+}$, and y is 1.

For example, the at least one ruthenium salt is $(X)_y[RuCl_6]^{3-}$ (I), wherein X is a trivalent cation and y is 1, preferably X is $Fe^{3+}$ and y is 1. Accordingly, X is a monovalent cation and y is 2 or 3 or X is a divalent cation and y is 1 or X is a trivalent cation and y is 1. Preferably, X is a monovalent cation and y is 2 or 3. More preferably, X is selected from the group consisting of $NH_4^+$, $Na^+$, $K^+$ and mixtures thereof, more preferably X is preferably selected from $NH_4^+$, $Na^+$ and mixtures thereof and most preferably X is $NH_4^+$.

In one embodiment, $(X)_y$ in the formula (I) is $NH_4^+$ and y is 2 or 3, preferably 2. That is to say, the at least one ruthenium salt of formula (I) is preferably diammonium hexachlororuthenate or triammonium hexachlororuthenate. Most preferably, the at least one ruthenium salt of formula (I) is diammonium hexachlororuthenate.

According to step c) of the process for the purification of ruthenium(III) chloride ($RuCl_3$), the hydrochloric acid solution of step a) and the ruthenium(III) chloride of step b) are combined and the obtained mixture is heated to a temperature T of $\geq 70°$ C.

In the process for the purification of ruthenium(III) chloride ($RuCl_3$), the combining of the hydrochloric acid solution of step a) and the ruthenium(III) chloride of step b) can be carried out by every means known to the skilled person for preparing a mixture of the hydrochloric acid solution and the ruthenium(III) chloride. For example, combining of the hydrochloric acid solution of step a) and the ruthenium(III) chloride of step b) is preferably carried out by mixing the hydrochloric acid solution with the ruthenium(III) chloride.

"Mixing" in the sense of the present invention can be effected by any conventional mixing process known to the skilled person. Preferably, the mixing is carried out under continuous agitation in order to evenly distribute the a ruthenium(III) chloride of step b) in the hydrochloric acid solution of step a).

In one embodiment of the process for the purification of ruthenium(III) chloride ($RuCl_3$), the combining of the hydrochloric acid solution of step a) and the ruthenium(III) chloride of step b) is carried out at room temperature, e.g., a temperature in the range from 10 to 30° C., preferably in the range from 15 to 25° C. and most preferably in the range from 20 to 25° C.

In step c) of the process for the purification of ruthenium(III) chloride ($RuCl_3$), the hydrochloric acid solution of step a) and the ruthenium(III) chloride of step b) are preferably combined such that the mole ratio of HCl in the hydrochloric acid solution to the ruthenium(III) chloride ($HCl/RuCl_3$) is from 20:1 to 1:1, more preferably from 15:1 to 1:1, even more preferably from 10:1 to 1:1 and most preferably from 5:1 to 2:1.

It is a further requirement of step c) of the process for the purification of ruthenium(III) chloride ($RuCl_3$) that the mixture obtained by combining of the hydrochloric acid solution of step a) and the ruthenium(III) chloride is heated to a temperature T of $\geq 70°$ C.

In one embodiment, the mixture obtained by combining of the hydrochloric acid solution of step a) and the ruthenium(III) chloride of step b) is heated to a temperature T in the range from 70° C. to 110° C., preferably in the range from 70° C. to 100° C., more preferably in the range from 75° C. to 90° C. and most preferably in the range from 75° C. to 85° C.

The heating in step c) of the process for the purification of ruthenium(III) chloride ($RuCl_3$) is preferably carried out for a period of time of at least 5 min, more preferably of at least 10 min and most preferably of at least 20 min. In a preferred embodiment, the heating in step c) of the process for the purification of ruthenium(III) chloride ($RuCl_3$) is carried out for a period of time of between 5 min and 240 min, preferably between 10 min and 120 min and most preferably between 20 min and 120 min, e.g., for 30 or 120 min.

For example, the heating in step c) of the process for the purification of ruthenium(III) chloride ($RuCl_3$) is carried out under continuous stirring at a constant temperature of about 80° C. for a period of time of 30 min or 120 min.

After heating the mixture obtained by combining of the hydrochloric acid solution of step a) and the ruthenium(III) chloride of step b), the mixture obtained in step c) is preferably allowed to cool down. More preferably, the mixture obtained in step c) is allowed to cool down to room temperature.

In one embodiment of the instant process for the purification of ruthenium(III) chloride ($RuCl_3$), the mixture obtained in step c) is concentrated before adjusting step d) is carried out.

It is appreciated that the concentrating step can be carried out by every means known to the skilled person for reducing the amount of solvent in the mixture obtained in step c). For example, the concentrating step is preferably carried out by rotary evaporation or distillation, preferably rotary evaporation.

In one embodiment of the process for the purification of ruthenium(III) chloride ($RuCl_3$), the concentrating step is carried out such that the total weight of the obtained mixture is reduced by at least 15.0 wt.-%, based on the total weight of the mixture obtained in step c). For example, the total weight of the obtained mixture is reduced by at least 25.0 wt.-%, more preferably by at least 30.0 wt.-% and most preferably by at 35.0 wt.-%, based on the total weight of the mixture obtained in step c) in the concentrating step.

It is to be noted that it is favorable for the overall yield in the process for the purification of ruthenium(III) chloride ($RuCl_3$) that the mixture obtained in step c) is a clear solution of the ruthenium(III) chloride in the hydrochloric acid solution, i.e., the solution is free of solids comprising ruthenium(III) chloride and/or impurities. If the mixture obtained in step c) contains solids comprising ruthenium(III) chloride and/or impurities, the mixture obtained in step c) is, before step d) is carried out, preferably diluted with water, preferably deionized water, and mixed for a sufficient period of time at an elevated temperature in order to ensure a complete dissolution of the solids comprising ruthenium(III) chloride and/or impurities in the solvent.

If the mixture obtained in step c) is concentrated before adjusting step d) is carried out, the optional dilution with water, preferably deionized water, is preferably carried out before the concentrating step.

Preferably, the complete dissolution of the solids comprising ruthenium(III) chloride and/or impurities in the solvent is carried out under continuous stirring at elevated temperature. In one embodiment, the complete dissolution of the solids comprising ruthenium(III) chloride and/or impurities in the solvent is carried out under continuous stirring at a constant temperature of at least 80° C., preferably of at least 90° C., more preferably of between 80° C. and 120° C. and most preferably of between 90° C. and 110° C. In another embodiment, the complete dissolution of the solids comprising ruthenium(III) chloride and/or impurities in the solvent is carried out under continuous stirring at a constant temperature of about 100° C.

In case the mixture obtained in step c) contains solids comprising ruthenium(III) chloride and/or impurities such that the mixture obtained in step c) is, before step d) is carried out, diluted with water and mixed for a sufficient period of time at an elevated temperature, the complete dissolution is preferably carried out for a period of time of at least 10 min, more preferably of at least 20 min and most preferably of at least 45 min. In one embodiment, the complete dissolution is carried out for a period of time of between 10 min and 120 min, preferably between 20 min and 90 min and most preferably between 45 min and 90 min, e.g., for about 60 min. For example, the complete dissolution of the solids comprising ruthenium(III) chloride and/or impurities in the solvent is carried out under continuous stirring at a constant temperature of about 100° C. for a period of time of about 60 min.

According to step d) of the instant process for the purification of ruthenium(III) chloride ($RuCl_3$), the pH of the mixture obtained in step c), or the optional concentrating step, is adjusted to a pH from 0 to 2.

It is appreciated that pH adjustment step d) can be carried out by every means known to the skilled person for increasing the pH of a mixture to a pH from 0 to 2. For example, pH adjustment step d) is preferably carried out by adding water, more preferably deionized water.

In one embodiment of the instant process for the preparation of ruthenium(III) chloride ($RuCl_3$), the pH of the mixture obtained in step c), or the optional concentrating step, is adjusted to a pH from 0.5 to 2, preferably to a pH from 0 to 1.5, and most preferably to a pH from 0.5 to 1.0 in process step d), preferably by adding water, more preferably deionized water.

According to step e) of the instant process for the purification of ruthenium(III) chloride ($RuCl_3$), the mixture obtained in step d) is passed through a cation exchanger.

It is appreciated that process step e) can be carried out by every cation exchanger and cation exchange method known to the skilled person. For example, process step e) is preferably carried out by using a strong cation exchanger. Examples of advantageous cation exchanger are known as DOWEX MONOSPHERE™ 650 C resin, AMBERJET™ 1200 or LEWATIT® S100H resin.

In the instant process for the purification of ruthenium(III) chloride ($RuCl_3$) it is decisive that process step e) is carried out immediately after process step e) in order to obtain ruthenium(III) chloride in high yield.

It is thus one requirement of the process for the purification of ruthenium(III) chloride ($RuCl_3$) that process step e) is carried out after process step d).

It is appreciated that the term "after" process step d) refers to the point in time after which process step d) is completed, i.e., after which the pH of the mixture obtained in step c) has been adjusted to a pH from 0 to 2, preferably to a pH from 0 to 1.5, and most preferably to a pH from 0.5 to 1.0.

In one embodiment of the present process for the purification of ruthenium(III) chloride ($RuCl_3$), process step e) is carried out immediately after process step d). Preferably, process step e) is carried out within a period of not more than 2 hours after process step d). More preferably, process step e) is carried out within a period of not more than 1 hour after process step d). Most preferably, process step e) is carried out within a period of not more than 30 minutes after process step d).

In process step e) a solution comprising ruthenium(III) chloride ($RuCl_3$) is obtained. Accordingly, the ruthenium (III) chloride ($RuCl_3$) obtained by the process for the preparation of ruthenium(III) chloride ($RuCl_3$) is in the form of a solution.

In one embodiment of the instant process for the purification of ruthenium(III) chloride ($RuCl_3$), the $RuCl_3$ is separated from the solution obtained in step e), preferably $RuCl_3$ is separated as solid from the solution obtained in process step e). If ruthenium(III) chloride ($RuCl_3$) is to be obtained as solid from the solution obtained in step e), the process for the purification of ruthenium(III) chloride ($RuCl_3$) preferably further comprises step f) of concentrating the solution obtained in step f).

It is appreciated that concentrating step f) can be carried out by every means known to the skilled person for reducing the amount of solvent in the ruthenium(III) chloride solution obtained in step e). For example, concentrating step g) is preferably carried out by evaporation such as rotary evaporation or distillation, preferably evaporation such as rotary evaporation.

In one embodiment of the process for the purification of ruthenium(III) chloride ($RuCl_3$), concentrating step f) is carried out until ruthenium(III) chloride ($RuCl_3$) is crystallized from the solution obtained in step e). For example, concentrating step f) is carried out until ruthenium(III) chloride ($RuCl_3$) is crystallized from the solution obtained in step e) in essentially completely dried form.

Thus, it is to be noted that the ruthenium(III) chloride ($RuCl_3$) obtained by the instant process for the purification of ruthenium(III) chloride ($RuCl_3$) can be obtained in dry form.

In view of the good results obtained, the present invention refers in another aspect to a use of the process for the preparation or the purification of ruthenium(III) chloride ($RuCl_3$). In one embodiment, the present invention refers to a use of the process for the preparation of ruthenium(III) chloride ($RuCl_3$). In another embodiment, the present invention refers to a use of the process for the purification of ruthenium(III) chloride ($RuCl_3$).

With regard to the definition of the process for the preparation of ruthenium(III) chloride ($RuCl_3$), the process for the purification of ruthenium(III) chloride ($RuCl_3$) and preferred embodiments thereof, reference is made to the statements provided above when discussing the technical details of the processes of the present invention.

The scope and interest of the invention will be better understood based on the following examples which are intended to illustrate certain embodiments of the invention and are non-limitative.

EXAMPLES

Comparative Example 1

200 g of ammonium hexachlororuthenate were mixed with 250 mL HCl (32% ic solution) and heated to 80° C. for 2 hours. The obtained solution was than diluted to 1 L with deionized water and heated for 3 hours until all solids were dissolved.

Subsequently, the obtained solution was allowed to cool down to room temperature and then filtered through a Buchner filter. The obtained solution was then left to stand overnight at room temperature. The pH of the diluted solution was at pH 0.8. Then the diluted solution was passed through a 7.5 L resin column filled with washed and regenerated Lewatit S100H cation exchange resin. The flow rate was 5.5 L/hr.

It was discovered that the resin loaded some ruthenium, indicating that the ruthenium(III) chloride hydrolyzes when diluted and left for extended time periods before further treatment.

The further purity analysis revealed that the diluted solution contained diammonium hexachlororuthenate.

Inventive Example 1

The solution obtained in comparative example 1 was concentrated to 2 L in a 50 L rotary evaporator, diluted again to a pH of 0.8 and immediately (within 30 min) passed through a 7.5 L resin column filled with washed and regenerated Lewatit S100H cation exchange resin. The flow rate was 5.5 L/hr.

In Inventive example 1 no ruthenium was loaded on the resin.

The eluent was then concentrated to 3 L in a 50 L rotary evaporator. The concentrated eluent was then transferred to a 5 L glass beaker and further concentrated on a hot plate to about 500 mL.

The purity analysis revealed that the sample had a ruthenium content of 21.7% comprising impurities far below the specification values.

Inventive Example 2

16.12 g $(NH_4)_2[RuCl_6]$ (49.47 mmol) were loaded in a 100 ml glass beaker and under continuous stirring 41.67 g HCl (32% ic solution; 0.367 mol) were added at room temperature. Subsequently, the solution was heated for 30 min at 80° C. and then the solution was allowed to cool down to room temperature.

For ensuring a complete dissolution of the $(NH_4)_2[RuCl_6]$ in the hydrochloric acid solution, 263.96 g of deionized water were added to the mixture which was then mixed at 100° C. for 1 hour at the rotary evaporator. Subsequently, 80 g of the solvent were removed at 100 mbar by distillation. The obtained mixture was allowed to cool down to room temperature and then the mixture was filtered through a Sartorius filter unit containing a 0.2 µm filter. No precipitates were observed in the filter. The obtained mixture had a pH of 1.

The obtained mixture (pH 1) was then immediately passed through a 25 cm resin column filled with washed Dowex Monosphere 650 C cation exchange resin. The cation exchange resin was loaded with deionized water. The flow rate was 300 mL/hr. The solution was passed through the cation exchange resin within about 2 hours and the resin was washed with deionized water.

The obtained eluent had a total weight of 638.36 g and was concentrated to 23.487 g at 100° C. and 100 mbar in a rotary evaporator. The obtained concentrate was a colorless liquid and was analyzed for inter alia ruthenium and chloride content, free acid and impurities.

The results of the analysis are summarized in Table 1

TABLE 1

| | |
|---|---|
| m (Ru educt) | 5.0 g |
| m (product) | 23.487 g |
| Ru content | 20.51% |
| m (Ru) | 4.82 g |
| yield | 96.4% |
| chloride content | 35.31% |
| C (free acid) | 6.7 mol/L |
| w (free acid) | 14.7% |
| potassium content | 20 ppm |
| sodium content | 150 ppm |
| density | 1.677 g/cm³ |

The results of the obtained product are compared with a standard specification for a $RuCl_3$ solution, which is summarized in Table 2.

TABLE 2

| | |
|---|---|
| Ru content | 19.0 to 24.0% |
| Element | Max limit in ppm |
| Rh + Pd + Ir + Pt | 1000 ppm |
| Os | 200 ppm |
| Cu | 200 ppm |
| Fe | 200 ppm |
| Na | 200 ppm |
| K | 200 ppm |
| Ca + Al + Si + Mg | 200 ppm |

From Table 1 it can be gathered that the sample had a ruthenium content of 20.51% at a yield of 96.4%. The impurities (Pt, Pd, Rh and Ir) were in total <128 ppm and thus in accordance with the specification requirements as set out in Table 2.

By further concentrating in a rotary evaporator a ruthenium content of at least 22.0% was reached and was thus also in accordance with the specification requirements.

We claim:
1. A process for the preparation of ruthenium(III) chloride $(RuCl_3)$, the process comprising at least the steps of:
   a) providing a hydrochloric acid solution,
   b) providing at least one ruthenium salt:

$(X)_y[RuCl_6]^{2-}$ or $(X)_y[RuCl_6]^{3-}$ wherein X is a monovalent, divalent or trivalent cation and y is 1, 2 or 3,
   c) combining the hydrochloric acid solution of step a) and the at least one ruthenium salt of step b) and heating the obtained mixture to a temperature T of ≥70° C.,
   d) adjusting the pH of the mixture obtained in step c) to a pH from 0 to 2, and
   e) passing a mixture obtained in step d) through a cation exchanger to obtain a solution comprising ruthenium (III) chloride $(RuCl_3)$.

2. A process for the purification of ruthenium(III) chloride $(RuCl_3)$, the process comprising at least the steps of:
   a) providing a hydrochloric acid solution,
   b) providing ruthenium(III) chloride in dry form or in a form of a solution, wherein the ruthenium(III) chloride comprises impurities,
   c) combining the hydrochloric acid solution of step a) and the ruthenium(III) chloride of step b) and heating the obtained mixture to a temperature T of ≥70° C.,
   d) adjusting the pH of the mixture obtained in step c) to a pH from 0 to 2, and
   e) passing a mixture obtained in step d) through a cation exchanger to obtain a solution comprising ruthenium (III) chloride $(RuCl_3)$.

3. The process according to claim 1, wherein in the at least one ruthenium salt:
   i) X is a monovalent cation selected from the group consisting of $NH_4^+$, $Na^+$, $K^+$, $Cu^+$ and mixtures thereof, and y is 2 or 3, or
   ii) X is a divalent cation selected from the group consisting of $Cd^{2+}$, $Co^{2+}$, $Cu^{2+}$, $Ni^{2+}$, $Pb^{2+}$, $Zn^{2+}$, $Sn^{2+}$, $Fe^{2+}$, $Mg^{2+}$, $Ca^{2+}$ and mixtures thereof, and y is 1, or
   iii) X is $Fe^{3+}$ and y is 1.

4. The process according to claim 1, wherein in process step c) the obtained mixture is heated to a temperature T in the range from 70° C. to 110° C.

5. The process according to claim 1, further comprising concentrating the mixture obtained in step c) before adjusting step d) is performed.

6. The process according to claim 5, wherein the concentrating is performed such that the total weight of the obtained mixture is reduced by at least 15.0 wt %, based on the total weight of the mixture obtained in step c).

7. The process according to claim 5, wherein the concentrating is performed by rotary evaporation or distillation.

8. The process according to claim 1, wherein in step d), the pH is adjusted to a pH from 0 to 1.5.

9. The process according to claim 1, wherein process step e) is performed within a period of not more than 2 hours after step d).

10. The process according to claim 1, wherein the process further comprises step f) concentrating the solution obtained in step e).

11. The process according to claim 10, wherein concentrating step f) is performed until $RuCl_3$ is crystallized from the solution.

12. The process according to claim 10, wherein step f) is performed by evaporation.

* * * * *